(12) United States Patent
Murugesan et al.

(10) Patent No.: US 9,857,252 B2
(45) Date of Patent: Jan. 2, 2018

(54) AUTOMATED E-ASSIST ADJUSTMENT FOR AN E-BIKE FOR ELEVATION GAINS AND LOSS

(71) Applicant: GM Global Technology Operations LLC, Detroit, MI (US)

(72) Inventors: Prakash Murugesan, Toronto (CA); Mark A. Manickaraj, Scarborough (CA); Michael J. Chappell, Oshawa (CA); Andrew M. Zettel, Port Moody (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 14/950,403

(22) Filed: Nov. 24, 2015

(65) Prior Publication Data

US 2017/0144724 A1 May 25, 2017

(51) Int. Cl.
| | | |
|---|---|---|
| *B62M 6/50* | (2010.01) |
| *B62M 6/90* | (2010.01) |
| *G01L 3/10* | (2006.01) |
| *B62M 6/45* | (2010.01) |
| *B62J 99/00* | (2009.01) |

(52) U.S. Cl.
CPC .............. *G01L 3/10* (2013.01); *B62M 6/45* (2013.01); *B62J 2099/0026* (2013.01); *B62K 2207/04* (2013.01)

(58) Field of Classification Search
CPC .. B62M 6/50; B62M 1/36; B62M 6/90; G01L 3/10
See application file for complete search history.

(56) References Cited

U.S. PATENT DOCUMENTS

| 5,878,831 A | * | 3/1999 | Saito | B60L 11/1801 180/206.2 |
|---|---|---|---|---|
| 6,367,833 B1 | * | 4/2002 | Horiuchi | B62M 9/122 280/260 |
| 2007/0195083 A1 | * | 8/2007 | Yoo | G06T 15/04 345/420 |
| 2007/0235973 A1 | * | 10/2007 | Lin | A63B 69/16 280/217 |
| 2008/0059452 A1 | * | 3/2008 | Frank | G06F 3/0481 |
| 2011/0160945 A1 | * | 6/2011 | Gale | B60L 3/0023 701/22 |
| 2011/0215548 A1 | * | 9/2011 | Horwat, Jr. | B62M 1/36 280/261 |
| 2012/0265414 A1 | * | 10/2012 | Cheng | B62M 9/123 701/55 |
| 2013/0179016 A1 | * | 7/2013 | Gale | B60L 11/007 701/22 |
| 2014/0166386 A1 | * | 6/2014 | Arimune | B62M 6/45 180/206.3 |

(Continued)

*Primary Examiner* — Tuan C. To
(74) *Attorney, Agent, or Firm* — Lorenz & Kopf, LLP

(57) ABSTRACT

A system for, and method of, providing e-assist on a route. A determination may be made of whether terrain data for the route is available. A rider effort level may be determined. The terrain data may be read when available. Whether a change in slope has occurred, or is anticipated to occur, corresponding to a need for an additional input to the rider effort level may be determined. The e-assist level may be adjusted to provide a level that offsets the need for the additional input, or the rider may be informed to provide an increased effort level.

11 Claims, 2 Drawing Sheets

(56) References Cited

U.S. PATENT DOCUMENTS

| | | | |
|---|---|---|---|
| 2014/0361511 A1* | 12/2014 | Thompson | B62M 1/30 280/262 |
| 2014/0371953 A1* | 12/2014 | Miller | B62M 25/08 701/2 |
| 2016/0096588 A1* | 4/2016 | Romeo | B62M 9/02 474/84 |
| 2016/0121963 A1* | 5/2016 | Tanaka | B60L 7/10 701/22 |
| 2016/0144928 A1* | 5/2016 | Chun | B62M 6/45 701/22 |
| 2016/0304157 A1* | 10/2016 | Craven | B62M 6/50 |

* cited by examiner

AUTOMATED E-ASSIST ADJUSTMENT FOR AN E-BIKE FOR ELEVATION GAINS AND LOSS

TECHNICAL FIELD

The field to which the disclosure generally relates includes electric cycles, and more particularly, includes automated e-assist adjustment in electric cycles.

BACKGROUND

An electric cycle may have various wheel arrangements and may include an on-board electric motor that can be used for propulsion of the cycle through one or more gears.

SUMMARY OF ILLUSTRATIVE VARIATIONS

A number of variations may involve a method of providing e-assist on a route. A determination may be made of whether terrain data is available for the route. A rider effort level may be determined. The terrain data may be read when available. Whether a change in slope has occurred, or is anticipated to occur, corresponding to a need for an additional input to the rider effort level may be determined. The e-assist level may be adjusted to provide a level that offsets the need for the additional input, or the rider may be informed to provide an increased effort level.

A number of other variations may involve method of providing e-assist to a cycle travelling on a route. Whether terrain data is available for the route may be determined. A rider effort level may be determined when the route has flat terrain. The terrain data may be read. A determination may be made of whether a change in slope has occurred corresponding to a need for an additional input to the rider effort level to maintain a consistent driver effort level both when the route has flat terrain and after the change in slope has occurred. The e-assist level may be adjusted to provide a level that offsets the need for an additional input.

A number of additional variations may involve a system for providing adjustment to an e-assist level of a cycle with a propulsion unit. A motor may drive the propulsion unit at the e-assist level. A controller may control the motor. A rider effort level sensor may provide a rider effort level to the controller. A terrain information source may provide information on changes in slope encountered by the cycle to the controller. The controller may adjustment the e-assist level based on the terrain information source.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
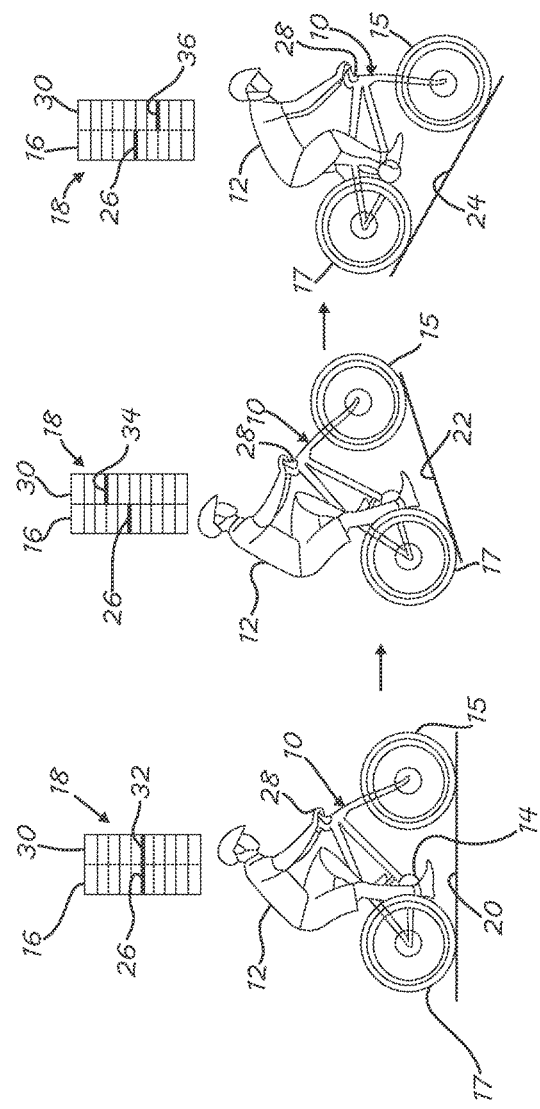
FIG. 1 illustrates a schematic diagram of automatic e-assist adjustment routine according to a number of variations.

In a number of variations as illustrated in FIG. 1, an electric cycle 10 may receive propulsion inputs from a rider 12 and/or from a propulsion unit 14. The propulsion unit 14 may receive its motive force from an electric motor and may be a mid-drive unit or another arrangement as known in the art to link one or more of the wheels 15, 17 with an electric motor. The level of effort exerted by the rider 12 may be represented by the first column 16 of the indictor 18. The indicator 18 may be mounted on the electric cycle 10 or may be provided in a remote device. The route taken by the rider 12 may result in the electric cycle 10 encountering flat terrain 20, as well as sloped terrain that requires an elevation gain 22 or an elevation loss 24 to navigate. Flat terrain 20 may be described as terrain where the front wheel 15 is substantially level with the rear wheel 17. The rider 12 may use an interface device 28 to select the level of e-assist provided by the propulsion unit 14. The interface device 28 may be on-board the electric cycle 10 such as on the handlebars or another structural member, or may be remote and may be linked to the propulsion unit through a wired or a wireless connection. In a number of variations the rider effort level 26 may be determined by reading a sensor, such as in the propulsion unit 14, such as a strain gage known in the art that measures the torque input of the rider 10. Readings may be averaged over a selected period of time while operating on flat terrain 20 to determine the rider effort level 26. In a number of other variations the rider 12 may select the level of the rider effort level 26, and may modify the level as desired. As a non-limiting example, while navigating the flat terrain 20 the rider 12 may input, such as through the interface device 28, a medium effort level represented by five bars as indicated by the rider effort level 26 in the first column 16. In a number of other examples the rider effort level 26 may be automatically determined. Having determined the rider effort level 26, the level may be maintained on the flat terrain 20 and may also be maintained during an elevation gain 22 and may also be maintained during an elevation loss 24.

In a number of variations while traversing the flat terrain 20 the e-assist input level shown in the column 30 of the indicator 18 may, as an example, also be five bars at e-assist level 32. The rider 12 may be provided with a selector adjustment in the interface device 28 to adjust the e-assist level on flat terrain 20 to a different level as desired. When the electric cycle 10 may encounter an elevation gain 22, the e-assist input level provided by the propulsion unit 14 may increase to seven bars, for example, as indicated by e-assist level 34, so that the rider effort level 26 remains constant with the level on flat terrain 20, but advancement of the cycle 10 remains constant. The elevation gain 22 may be associated with the front wheel 15 being higher than the rear wheel 17. When the electric cycle 10 may encounter an elevation loss 24, the e-assist input level provided by the propulsion unit 14 may decrease to three bars, for example, as indicated by e-assist level 36, so that the rider effort level 26 remains constant with the level on flat terrain 20. The e-assist level may be automatically adjusted within its bandwidth as terrain changes are encountered with elevation gains and losses at various grades to maintain a constant rider effort level 26.

Figure 2:
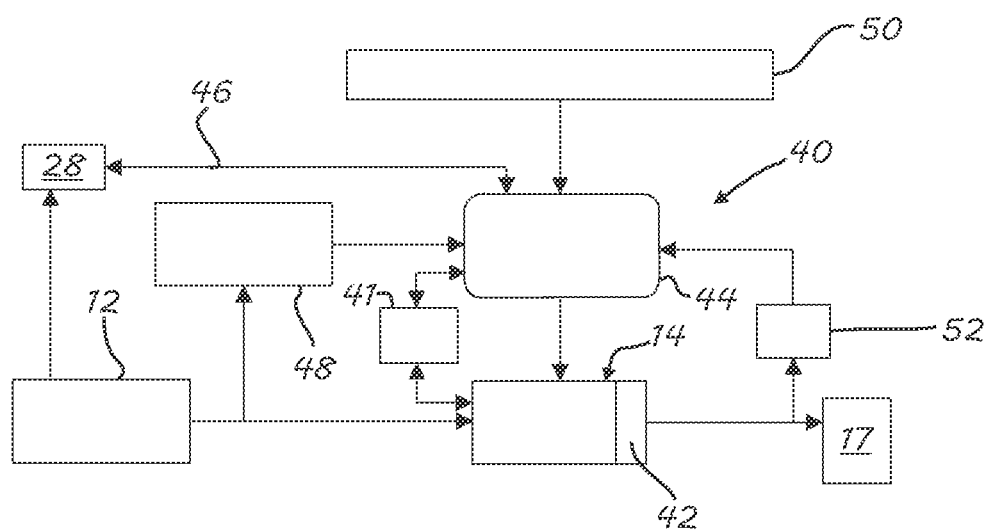
FIG. 2 illustrates a system for automatic e-assist adjustment according to a number of variations.

FIG. 2 illustrates a number of variations which may include an automated e-assist system 40. The automated e-assist system 40 may be associated with the electric cycle 10 that may be propelled by the rider 12 by pedaling. The electric cycle 10 may be propelled by a motor 42 of the propulsion unit 14 that may draw power from an energy storage device 41 and may be used to assist the rider as a supplement, or alternative power input. The energy storage device 41 may be a battery, or a number of batteries, or another available device to store electrical energy. In a number of variations the electric cycle 10 may be propelled solely by the motor 42 without pedaling effort by the rider. The automated e-assist system 40 may be used to limit the level of rider exertion and may be used to maintain a consistent level of rider effort, which may be desirable in the uses of the electric cycle 10, such as for a commuting vehicle. In a number of variations the automated e-assist system 40 may optimize energy storage in the energy storage device 41 for future needs. The controller 44 may monitor the state of charge of the energy storage device 41 and may communicate with the rider 12 through the interface device 28. For example, the rider 12 may be alerted to supply additional pedaling effort to reduce the load on the motor 42 or to provide torque in excess of that needed to propel the vehicle for use in increasing the state of charge of the energy storage device 41.

In a number of variations the motor 42 may receive input from a controller 44 that may be onboard the cycle 10. Methods, algorithms, or parts thereof may be implemented in a computer program product of the controller 44 including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of variations, the program(s) may be embodied on computer readable media, which can include one or more storage devices, articles of manufacture, or the like. Illustrative computer readable media may include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data may be transferred or provided over a network or another communications connection (either wired, wireless, or a combination thereof). Any combination(s) of the above examples is also included within the scope of the computer-readable media. It is therefore to be understood that methods may be at least partially performed by any electronic articles and/or devices capable of executing instructions corresponding to one or more steps of the disclosed methods.

In a number of variations the controller 44 may be linked to one or more input devices which may include the interface device 28. The interface device 28 may, as examples, include a computing device such as a smartphone device, or a selector device such as a wearable input device. Other input devices may be any device that can communicate information to the controller 44 and to the rider 12, including but not limited to, a manual selector with a display onboard the electric cycle 10, a tablet, personal computer or other internet connected device, or another device wirelessly connected to, or with a wired connection to, the electric cycle 10. The interface device or devices may communicate information between the rider 12 and the controller 44 through an interface 46. The interface 46 may be wired or wireless. In the case of a wireless interface the controller 44 may include a receiver, or a transmitter and receiver, for purposes of communication with the input device or devices. In a number of variations, the interface device 28 may provide the rider 12 with input options to switch optimization targets. For example, the rider 12 may select between efficiency, driver torque buffering, speed, reserve battery, or other options. A number of sensors 48 may communicate with the controller 44. The sensors 48 may include any of a number of devices providing information such as torque that may be representative of the effort level exerted by the rider 12. The torque level may be provided by a torque measurement device that may be constructed and arranged to sense or measure torque and may include, but not be limited to, a strain gauge that operates as known in the art. For example, a torque sensor may be associated with the crank of the electric cycle through which the rider 12 inputs pedaling effort.

In a number of variations a terrain information source 50 may be provided by a number of available sources such as a map application with terrain data, a GPS unit, a level sensor on the electric cycle 10, or any of a number of other options from which data on slope can be extracted for use by the controller 44. The controller 44 may be preprogrammed to operate the motor 42 to provide propulsion assistance (e-assist), according to set algorithms in the controller 44 for example by reading a lookup table to discern the level of e-assist adjustment for the encountered slope. The rider 12 may adjust the e-assist level in real time by selecting a different setting from the selector 28. The controller 44 may evaluate terrain data on the route and may anticipate high load events such as upcoming steep uphill segments and may prompt the rider 12 through the interface device 28 to provide additional input torque. The controller 44 may read the state of charge of the energy storage device 41 and may determine a target state of charge sufficient to power the motor 42 through the upcoming segments or the route. The controller 44 may calculate the time interval over which additional torque from the rider is needed and may allocate the rider alert, such as during downhill travel, during which the rider 12 is asked to provide additional effort to meet the target state of charge. In a number of variations the controller 44 may use the terrain data source 50 to look ahead and prompt the rider 12 through the interface device 28 to reduce pedal effort contribution and use the reserve in the energy storage device 41. For example, the controller 44 may calculate state of charge recuperation anticipated to be gained from an upcoming downhill segment, and may use that data to inform the rider 12 of the opportunity to reduce effort.

In a number of variations if the terrain information source 50 is not available or temporarily lost, the controller 44 may use torque resistance encountered by the electric cycle 10 to determine whether a change in encountered torque may necessitate a change in energy input. For example the electric cycle 10 may include a torque sensor 52 such as at the hub of the rear wheel 17 to measure the torque encountered by the electric cycle 10. If a change in torque occurs, the controller 44 may, for example, reference a lookup table to read the e-assist level adjustment needed to offset the change. The controller 44 may send a signal to increase or decrease torque output of the propulsion unit 14 to maintain the input level provided by the rider.

Figure 3:
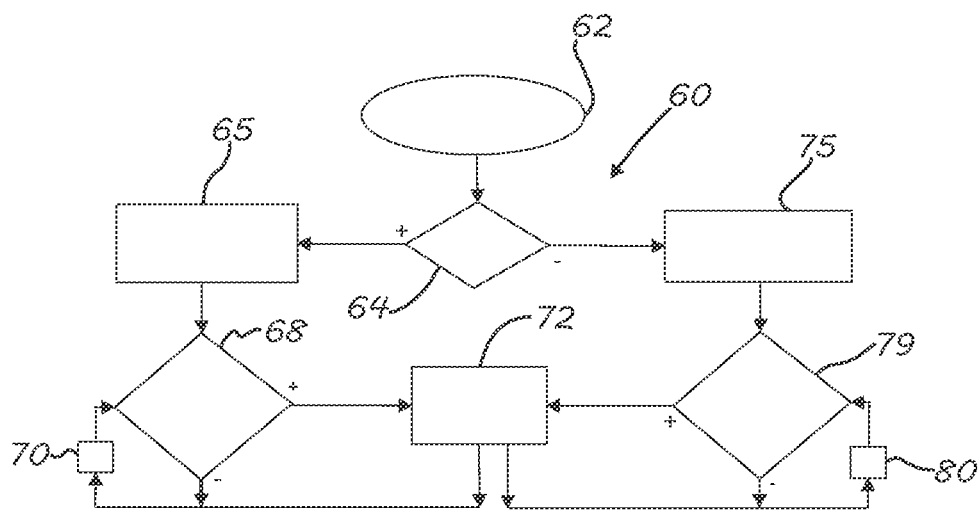
FIG. 3 illustrates a method of automatic e-assist adjustment according to a number of variations.

In a number of variations a method carried out, in part by the controller 44, is illustrated in FIG. 3 as method 60. The method 60 may control operation of the motor 42 to provide e-assist to the rider inputs to propel the electric cycle 10. E-assist may be provided to maintain the rider effort level 26 or to otherwise limit exertion by the rider. The rider may control the level of e-assist which may offset the need for rider pedal effort with torque supplied by the motor 42. Initiation of the method 60 may occur when automated e-assist adjustment is enabled at step 62. Enablement may be selected by the rider or may be triggered by the controller 44 according to a selection made by the rider for intervention, or according to preprogrammed factors. From step 62 the method 60 may proceed to step 64 where a determination may be made as to whether terrain data is available and is being actively communicated to the controller 44. For example map data or sensor data may report terrain slope or changes in terrain slope to the controller 44. If it is determined that terrain data is available at step 64, the method 60 may proceed to step 65 where the rider effort level for flat terrain 20 may be determined. In a number of variations the rider effort level 26 may be determined by reading a sensor, such as in the torque sensor 48. Readings of the torque sensor 48 may be averaged over a selected period of time while operating on flat terrain 20 to determine the rider effort level 26. In a number of other variations the rider 12 may select a desired level of the rider effort level 26. Once the rider input level 26 is determined or selected, the method 60 may proceed to step 68 where the terrain data source identified at step 64 is referenced to identify changes in slope. The controller 44 may be preprogrammed with slope change increments equivalent to a need for various e-assist adjustments. The controller 44 may, for example, reference a lookup table to determine the e-assist adjustment, if any, corresponding to the identified slope change. If it is determined at step 68 that no slope change has occurred for which an e-assist adjustment is necessary, the method may return to step 68 after a time period preset in a timer step 70. If at step 68 it is determined that a slope change has occurred for which an e-assist adjustment is necessary, the method 60 may proceed to step 72. At step 72 the level of e-assist may be adjusted at the identified amount such as by changing the level of current supplied to the motor 42. From step 72, the method 60 may return to step 70 and steps 70 and 72 may be repeated to continuously adjust e-assist levels for changes in terrain.

Returning to step 64, in a number of variations, if it is determined that terrain data is not available at step 64, the method 60 may proceed to step 75 where the rider effort level for flat terrain 20 may be determined. In a number of variations the rider effort level 26 may be determined by reading a sensor, such as in the torque sensor 48. Readings of the torque sensor 48 may be averaged over a selected period of time while operating on flat terrain 20 to determine the rider effort level 26. In a number of other variations the rider 12 may select the level of the rider effort level 26. Once the rider input level 26 is determined or selected, the method 60 may proceed to step 79 where the torque data source such as torque sensor 52 is referenced to identify changes in torque. The controller 44 may be preprogrammed with torque change increments equivalent to a need for various e-assist adjustments. The controller 44 may, for example, reference a lookup table to determine the e-assist adjustment, if any, corresponding to the identified torque change. If at step 79 it is determined that no torque change has occurred for which an e-assist adjustment is necessary, the method may return to step 79 after a time period preset in a timer step 80. If at step 79 it is determined that a torque change has occurred for which an e-assist adjustment is necessary, the method 60 may proceed to step 72. At step 72 the level of e-assist may be adjusted the identified amount such as by changing the level of current supplied to the motor 42. From step 72, the method 60 may return to step 79 after the preset time step 80, and steps 79 and 72 may be repeated to continuously adjust e-assist levels for changes in torque indicative of changes in slope.

Through the foregoing, a system 40 and/or a method 60 may provide a cycle rider 12 with e-assist to maintain a consistent rider effort level. Rider input may provide adjustable e-assist intervention levels. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a method of providing e-assist on a route. A determination may be made of whether terrain data for the route is available. A rider effort level may be determined. The terrain data may be read when available. Whether a change in slope has occurred, or is anticipated to occur, corresponding to a need for an additional input to the rider effort level may be determined. The e-assist level may be adjusted to provide a level that offsets the need for the additional input, or the rider may be informed to provide an increased effort level.

Variation 2 may include the method according to variation 1 and may include reading a torque level when terrain data is not available indicative of the change in slope. E-assist may be provided when terrain data is not available by determining an e-assist adjustment based on the torque level and corresponding to the change in slope.

Variation 3 may include the method according to variation 1 and may include providing a sensor. The rider effort level may be measured with the sensor. The step of determining the rider effort level may comprise reading the sensor when the route comprises flat terrain, and averaging a number of the torque sensor readings to arrive at the rider effort level.

Variation 4 may include the method according to variation 1 and may include providing an input device through which a rider manually inputs a rider effort level. The step of determining the rider effort level may comprise reading the rider effort level from the input device.

Variation 5 may include the method according to variation 1 and may include providing an energy storage device. Rider effort may be optimized to conserve a state of charge of the energy storage device by informing the rider through an interface device to provide additional input effort.

Variation 6 may include the method according to variation 5 and may include waiting a period of time before repeating the step of determining whether a change in slope has occurred.

Variation 7 may include the method according to variation 1 and may include adjusting the level of e-assist maintaining the rider effort level at a consistent level regardless of an extent of the change in slope.

Variation 8 may involve a method of providing e-assist to a cycle travelling on a route. Whether terrain data for the route is available may be determined. A rider effort level may be determined when the route has flat terrain. The terrain data may be read. A determination may be made of whether a change in slope has occurred corresponding to a need for an additional input to the rider effort level to maintain a consistent driver effort level both when the route has flat terrain and after the change in slope has occurred. The e-assist level may be adjusted to provide a level that offsets the need for additional input.

Variation 9 may include the method according to variation 8 and may include reading a torque level when terrain data is not available that may be indicative of the change in slope. E-assist may be provided when terrain data is not available by determining an e-assist adjustment based on the torque level and corresponding to the change in slope.

Variation 10 may include the method according to variation 8 and may include providing a sensor. The rider effort level may be measured with the sensor. The step of determining the rider effort level may comprise reading the sensor when the route comprises flat terrain, and averaging a number of the torque sensor readings to arrive at the rider effort level.

Variation 11 may include the method according to variation 8 and may include providing an input device through which a rider may manually input a rider effort level. The step of determining the rider effort level may comprise reading the rider effort level from the input device.

Variation 12 may include the method according to variation 8 and may include providing an energy storage device. Rider effort may be optimized to conserve a state of charge of the energy storage device by informing the rider through an interface device to provide additional input effort.

Variation 13 may involve a system for providing adjustment to an e-assist level of a cycle with a propulsion unit. A motor may drive the propulsion unit at the e-assist level. A controller may control the motor. A rider effort level sensor may provide a rider effort level to the controller. A terrain information source may provide information on changes in slope encountered by the cycle to the controller. The controller may adjustment the e-assist level based on the terrain information source.

Variation 14 may include the system of variation 13 wherein the rider effort level sensor may be a torque sensor.

Variation 15 may include the system of variation 14 and may include a second torque sensor that may be engaged with the propulsion unit measuring torque output there from.

Variation 16 may include the system of variation 13 and may include a rider input device communicating with the controller.

Variation 17 may include the system of variation 13 and may include an indicator communicating with the cycle and displaying the rider effort level and the e-assist level.

Variation 18 may include the system of variation 17 wherein a rider input may provide the rider effort level to the propulsion unit.

Variation 19 may include the system of variation 13 wherein the terrain information source may comprise a map application.

Variation 20 may include the system of variation 13 and may include a torque sensor connected with the propulsion unit, wherein the changes in slope may be determined from the torque sensor.

The above description of select variations within the scope of the invention is merely illustrative in nature and, thus, variations or variants thereof are not to be regarded as a departure from the spirit and scope of the invention.

What is claimed is:

1. A method of providing e-assist over a route comprising determining whether terrain data is available for the route, reading a sensor when the route has flat terrain, determining a rider effort level using the sensor reading, reading the terrain data when available, determining whether a change in slope has occurred, or is anticipated to occur, corresponding to a need for an additional input to the rider effort level, adjusting the e-assist to provide an e-assist level that offsets the need for the additional input, or informing the rider to provide an increased effort level, reading the sensor after determining terrain data is not available to determine whether a torque level indicates the change in slope, and providing the e-assist when terrain data is not available by determining an e-assist adjustment based on the torque level and corresponding to the change in slope.

2. The method according to claim 1 further comprising providing an input device through which a rider manually inputs a rider effort level, wherein the step of determining the rider effort level comprises reading the rider effort level from the input device.

3. The method according to claim 1 wherein the terrain data comprises a terrain map of the route, and comprising reading the terrain map, determining from the terrain map whether an uphill terrain segment is anticipated on the route, providing an energy storage device, and optimizing rider effort to conserve a state of charge of the energy storage device by informing the rider through an interface device to provide additional input effort prior to reaching the uphill terrain, when the uphill terrain is anticipated.

4. The method according to claim 3 further comprising determining whether a downhill terrain segment is anticipated on the route, calculating a state of charge recuperation to be gained for the energy storage device from the downhill terrain segment, and informing the rider to reduce the rider effort level when the downhill terrain segment is anticipated.

5. The method according to claim 1 further comprising adjusting the level of e-assist maintaining the rider effort level at a consistent level regardless of an extent of the change in slope.

6. A method of providing e-assist over a route comprising determining whether terrain data is available for the route, reading a sensor when the route has flat terrain, determining a rider effort level using the sensor reading, reading the terrain data when available, determining whether a change in slope has occurred, or is anticipated to occur, corresponding to a need for an additional input to the rider effort level, adjusting the e-assist to provide an e-assist level that offsets the need for the additional input, or informing the rider to provide an increased effort level, wherein the step of determining the rider effort level comprises reading the sensor and averaging a plural number of the readings to arrive at the rider effort level.

7. A method of providing e-assist to a cycle travelling on a route comprising determining if a map with upcoming terrain data for the route is available, determining a rider effort level when the route has flat terrain, reading the map, determining whether the map indicates a change in slope on the route corresponding to a need for an additional input to the rider effort level to maintain a consistent driver effort level both when the route has flat terrain and after the change in slope has occurred, and adjusting a level of the e-assist to provide a level that offsets the need for additional input.

8. The method according to claim 7 further comprising reading a torque level only when the map is not available, the torque level indicative of the change in slope, and providing e-assist when the map is not available by determining an e-assist adjustment based on the torque level and corresponding to the change in slope.

9. The method according to claim 7 further comprising providing a sensor, measuring the rider effort level with the sensor, wherein the step of determining the rider effort level comprises reading the sensor when the route comprises flat terrain, and averaging a number of the torque sensor readings to arrive at the rider effort level.

10. The method according to claim 7 further comprising providing an input device through which a rider manually inputs a rider effort level, wherein the step of determining the rider effort level comprises reading the rider effort level from the input device.

11. The method according to claim 7 further comprising providing an energy storage device, and optimizing rider effort to conserve a state of charge of the energy storage device by informing the rider through an interface device to provide additional input effort.

* * * * *